United States Patent
Wolfe

[15] 3,659,434
[45] May 2, 1972

[54] METHOD FOR BALANCING TUBULAR SHAFTING

[72] Inventor: Robert A. Wolfe, Rochester, Pa.
[73] Assignee: Pittsburgh Tubular Shafting, Inc., Rochester, Pa.
[22] Filed: Jan. 15, 1971
[21] Appl. No.: 106,656

[52] U.S. Cl. ................................. 64/1 R, 74/573, 29/407
[51] Int. Cl. ................................................. F16c 1/00
[58] Field of Search .................. 64/1 R, 1 V; 33/84; 74/573, 74/574; 29/407

[56] References Cited

UNITED STATES PATENTS 1,172,947   2/1916   Coppage ............................... 74/573
3,592,884   7/1971   Williams ............................... 64/1 R Primary Examiner—Carroll B. Dority, Jr.
Attorney—Stanley J. Price, Jr.

[57] ABSTRACT

Tubular shafting having a metallic outer tubular member and a cellular resinous core is both kinetically and dynamically balanced by drilling holes in the outer metallic tubular member at locations where additional weight is required to balance the shafting. A predetermined amount of molten metal is poured through the drilled holes into the internal portion of the tubular shafting. The molten metal flows through passageways in the cellular resin core and solidifies against the inner wall of the outer metallic tubular member. The passageways formed in the cellular resin are filled with a similar cellular resin and the holes in the outer metallic tubular member are suitably plugged.

9 Claims, 7 Drawing Figures

PATENTED MAY 2 1972 3,659,434

INVENTOR.
Robert A. Wolfe.
BY Stanley J. Price
HIS ATTORNEY

3,659,434

METHOD FOR BALANCING TUBULAR SHAFTING

BACKGROUND OF THE INVENTION

1. Field of the Invention

This invention relates to a method for balancing tubular shafting and particularly a method for balancing tubular shafting by adding weight to the internal portion of the tubular shaft.

2. Description of the Prior Art

The conventional method both kinetically and dynamically balancing a shaft includes the addition of weight to either the outer surface of the shaft or forming cavities in the shaft and inserting plugs of a different gravity material into the cavities. U.S. Pat. No. 2,017,609 discloses the positioning of eccentric plugs within a tubular shaft at locations where out of balance effects are likely to occur. The eccentric plugs increase the weight of the tubular shaft at these locations and thereby reduce the out of balance effect of the tubular shaft. U.S. Pat. No. 1,314,005 discloses a method of balancing a wheel by forming a annular cavity therein and filling the cavity with a plurality of non-miscible substances having different specific gravities. The non-miscible substances automatically shift with respect to the axis of the wheel during rotation of the wheel and thus, balance the wheel.

I have, in the past, both kinetically and dynamically balanced a shaft by positioning discrete spherical weights within a cavity formed in the resinous core of tubular shafting having a metallic outer tubular member and an inner resinous core. The discrete spherical weights were inserted through a hole in the outer metallic tubular member into the cavity formed in the resinous core. The cavity was then filled with a resin and plugged. The spherical weights had a tendency to stack transversely to the shaft axis and resulted in variables in the weight-radius balance.

SUMMARY OF THE INVENTION

According to the present invention, the cavity of a metallic tube is filled with a resin to form tubular shafting having a resinous core. The location or locations on the tubular shafting where additional weight is required to balance the shafting both kinetically and dynamically is determined. Openings are formed in the tubular shafting at these locations where additional weight is required to balance the shafting. A preselected amount of molten material is poured through the opening into the tube cavity. The molten material is solidified at a location adjacent the inner wall of the metallic tube and the opening is then filled with a resin to secure the solidified molten metal in place and provide a balanced tubular shafting. By the above process, an accurate addition of weight to the tubular shafting is obtained at the exact location where required. The added weight is substantially parallel to the longitudinal axis of the shafting and is located adjacent the periphery of the tubular shafting and within the metallic tubular outer member.

The principal object of this invention, therefore, is to provide a process for dynamically and kinetically balancing tubular shafting without distorting the external surface of the tubular shafting.

Another object of this invention is to kinetically and dynamically balance tubular shafting with a quantity of molten material positioned adjacent the inner wall of the outer tubular member at a location where additional weight is required to dynamically and kinetically balance the tubular shafting.

These and other objects and advantages of this invention will be more completely disclosed and described in the following specification, the accompanying drawings and the appended claims.

DESCRIPTION OF THE PREFERRED EMBODIMENTS

Figure 1:
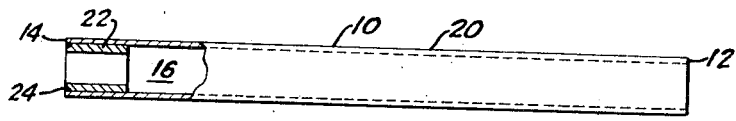
FIG. 1 is a view in side elevation and partially in section of a metallic tubular member with an end plug secured therein.

Referring to the drawings where the sequential steps of forming and balancing tubular shafting is illustrated, a relatively light gauge tubing designated by the numeral 10 is cut to a preselected length and has end portions 12 and 14. The tubing 10 has a central passageway or cavity 16 defined by the inner wall 18 of the metallic tubing 10. The metallic tubing 10 has a generally cylindrical smooth outer surface 20.

A second short section of tubing 22 having an outer diameter slightly smaller than the inner diameter of the light gauge tubing 10 and having a serrated outer surface is inserted into one end portion 14 of the tube 10 and is secured to the tubing 10 by means of welds 24 along the end wall of tubing end portion 14. The tubing 22 will also be referred to as a plug member that serves to rigidify an end portion of the tubular shafting.

The tubular member 10 is heated to approximately 1,800° F. and is swaged or rotatably forged in a suitable machine to a preselected diameter of the tube end portion 14 with the plug member 22 positioned therein. The short section or plug 22 is forged with the tube 10 and both tubes are displaced to the same shape.

Figure 2:
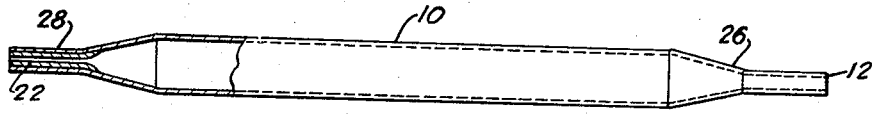
FIG. 2 is a view similar to FIG. 1 with the end portions of the tubular member swaged.
Figure 3:
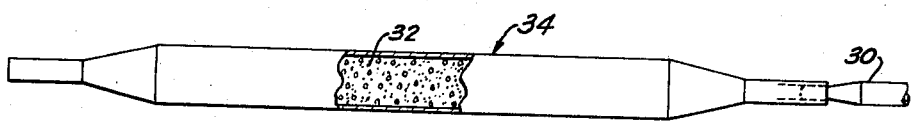
FIG. 3 is a view similar to FIG. 2 illustrating the tubular member with apparatus for injecting the liquid resinous material into the inner cavity of the tubular member. The sectional view of FIG. 3 illustrates the cellular core of resin within the metallic outer tubular member.

The other end portion 12 of tube 10 is similarly swaged without a plug member 22 as illustrated in FIG. 2. Subsequent to the swaging of the end portions 12 and 14, the metallic tubular member 10 is then hydraulically straightened on both ends so that the swaged end portions referred to by numerals 26 and 28 are concentric with the body portion of the tube 10. The length of the tube 10 is also straightened within practical tolerances to thereby provide a straight tubular member 10 with aligned swaged end portions 26 and 28. The tube member 10 has an internal cavity 16 defined by the tube inner wall 18. The tube 10 is preferably positioned vertically and an injector nozzle 30 is positioned in the end portion 12. The liquid constituent of a resinous material are pumped into the tubular cavity 16. The constituents react within the cavity 16 and cellulate to fill the entire cavity 16 of the tubular member 10 with a cellular resinous material 32.

A suitable resinous material is a polyurethane foam compounded by Callery Chemical Division of Mine Safety Appliances and sold under the trade name Callery Chemical High Rise 310. The cellular polyurethane has a "cream time" of 3 to 4 seconds and a rise or cellulation time of 65 seconds. With this type of cellular polyurethane, the tubular shaft 10 may be positioned vertically while being filled with the cellular polyurethane without the formation of voids within the tubular member 10. It should be understood that the tubular shaft 10 may have a longitudinal dimension of 12–14 feet with a relatively small inner diameter of the cavity 16. The cellular polyurethane has approximately 90 percent closed cells and a density of 2 pounds per cubic foot. Other suitable cellular polyurethanes and processes for cellulating the constituents are disclosed in U.S. Pat. Nos. 3,072,582; 2,888,409 and 2,866,774.

It should be understood, however, that although in the preferred embodiment, a cellular polyurethane core is employed to fill the cavity 16, other types of resinous materials either cellular or noncellular may also be employed to fill the cavity 16 and to provide rigidity to the relatively light gauge metallic tubular shaft 10. It has been found that the resinous core dampens the resonant frequency of the tubular shafting in addition to increasing the rigidity of the tubular shaft.

Subsequent to filling the cavity 16 with the cellular polyurethane 32, the swaged end portions 26 and 28 are machined to preselected tolerances so that they will fit standard commercially available bearings. The length of the shafting is then rechecked and again straightened, if necessary. The metallic tube 10 filled with the cellular urethane 32 will hereinafter be referred to as tubular shafting 34.

The tubular shafting 34 is then positioned on a suitable machine to determine both the kinetic and dynamic unbalance of the tubular shafting 34 and the exact location where additional weight is required on the shafting 34 to provide both a kinetically and dynamically balanced shaft. A suitable machine for electronically determining both the kinetic and dynamic balance of the shaft to relatively close tolerances may be purchased from the Stewart Warner Company. It should be understood, however, that any suitable machine that will provide information concerning the kinetic and dynamic balance of the shaft may be employed.

Figure 4:
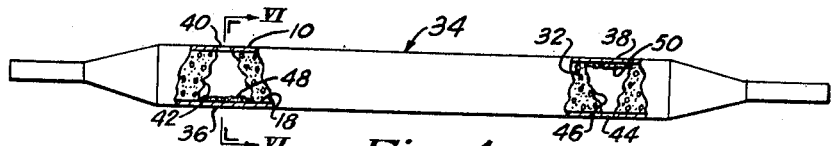
FIG. 4 is similar to FIG. 3 and illustrates in section, the holes drilled in the outer tubular member and the passageways formed in the cellular core with the molten metal solidified against the inner wall of the outer tubular member.

For illustrative purposes, FIG. 4 indicates that the tubular shafting 34 requires additional weight at locations 36 and 38 on the periphery of the tubular shaft 10. To provide the additional weight required, the tubular shafting 34 first has an aperture 40 drilled in the wall of the outer metallic tubing 10 at a location diametrically opposite the location 36 where the additional weight is required. A passageway 42 is formed in the cellular polyurethane resin 32 and preferably has a larger cross sectional area adjacent the location 36 than adjacent the aperture 40. A similar aperture 44 and passageway 46 is formed in the tube 10 and cellular polyurethane 32 at the location 38 on the tubular shafting 34.

Figure 6:
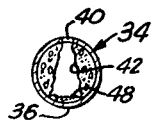
FIG. 6 is a view taken along the line VI—VI of FIG. 4 illustrating the solidified molten metal adjacent to the inner walls of the outer metallic tube.

A predetermined amount of molten lead indicated by the amount of unbalance is prepared by melting suitable, carefully weighed quantities of lead and the molten lead is poured through the opening 40 into the cavity 16 and passageway 42. The molten lead indicated by the numeral 48 contacts the inner wall 18 of the metallic tubular member 10 and solidifies at a location adjacent the inner wall 18. The solidified lead tends to spread out, as is illustrated in FIG. 6, to have an arcuate outer surface substantially the same as the inner wall 18 of tubular member 10. The solidified lead 48 is aligned longitudinally with the axis of the tubular shafting 34 and is positioned adjacent the periphery of the tubular shafting 34 within the tubular member 10.

The tubular shafting 34 is then rotated to position the aperture 44 above the location 38 on shaft 10 and a preselected quantity of molten lead 50 is similarly poured through the opening 44 so that it solidifies adjacent the inner wall 18 of the cavity 16 as illustrated in FIG. 4. Although the preferred molten metal to provide the added weight for balancing the tubular shafting 34 is lead, because of its relatively low melting point, it should be understood that any other material, metallic or other that is liquid at an elevated temperature and solidifies on contact with a metallic surface and has a sufficiently high specific gravity to provide the added weight required within the limited space provided, may also be employed in lieu of the molten lead.

Figure 5:
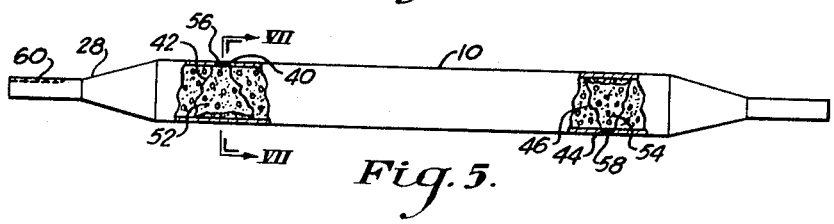
FIG. 5 is a view similar to FIG. 4 illustrating the opening or passageway in the resinous core member filled with a similar cellular resinous material and the hole in the outer metallic tubular member plugged with a suitable plastic plug.
Figure 7:
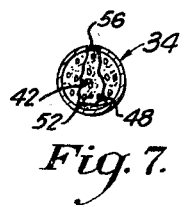
FIG. 7 is a view taken along the line VII—VII of FIG. 5 illustrating the passageways in the cellular core member filled with a similar cellular resin to maintain the solidified molten metal in position adjacent the inner walls of the outer metallic tubular member and the plugs in the holes formed in the outer metallic tubular member.

As is illustrated in FIG. 5, the passageways 42 and 46 are filled with cellular polyurethane designated 52 and 54. The polyurethane admixture previously discussed in liquid form, is pumped into the passageways 42 and 46 through the apertures 40 and 44 in the tubular member 10. The liquid constituents react within the passageways 42 and 46 to polymerize and cellulate and substantially fill the passageways 42 and 46 with the same cellular polyurethane as the core 32 within the cavity 16. The cellular polyurethane maintains the solidified lead weights 48 and 50 in the position indicated in FIGS. 5 and 7 adjacent the inner surface 18 of tube 10. Plastic plugs 56 and 58 are positioned in the apertures 42 and 44 and their outer surface is filed smooth with the outer surface 20 of tube 10 to provide a continuous smooth outer surface 20 on the tube 10. Thereafter, a key slot 60 is formed in the swaged end portion 28. The plug member 22 provides the added mass necessary to cut the key slot 60 in the swaged end portion 23 without weakening the swaged end portion 28.

With the above described process, it is now possible to rapidly and accurately add additional weight to various locations within the tubular shafting 34 to provide both dynamic and kinetic balance for the tubular shafting 34. The tubular shafting 34 comprises a relatively thin gauge metallic outer tube 10 with a rigidifying core 32 of preferably cellular resinous material. The end portions of the tubular shafting 34 are suitably swaged and machined to dimensions for conventional bearing members. The tubular shafting 34 may be fabricated in various lengths and provide a kinetically and dynamically balanced shaft for supporting blowers of various dimensions without the necessity of intermediate bearing supports.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A process for balancing tubular shafting comprising,
   filling the cavities of a metallic tube with a resin to form tubular shafting,
   determining the location on the tubular shafting where additional weight is required to balance said tubular shafting,
   forming an opening in said tubular shafting at said location where said additional weight is required to balance said tubular shafting,
   pouring a preselected amount of molten material through said opening into said tube cavity,
   solidifying said molten material at a location adjacent the inner wall of said metallic tube, and
   filling said opening with a resin to secure said solidified molten material in place adjacent said inner wall of said metallic tube.

2. A process for balancing tubular shafting as set forth in claim 1 which includes,
   forming an aperture in said metallic tube at a location opposite the location where additional weight is required to balance said tubular shafting.

3. A process for balancing tubular shafting as set forth in claim 2 which includes,
   forming a passageway in said resin from said aperture to the inner wall of said metallic tube where said additional weight is required to balance said tubular shafting.

4. A process for balancing tubular shafting as set forth in claim 2 which includes,
   inserting a plug in said aperture after said opening is filled with said resin.

5. A process for balancing tubular shafting as set forth in claim 1 in which the filling of said metallic tube cavities includes,
   positioning said metallic tube vertically,
   pumping a liquid admixture of resin constituents and a cellulating agent into the cavity of said metallic tube, and
   reacting the constituents of said liquid admixture and filling said cavity with cellular polyurethane resin.

6. A process for balancing tubular shafting as set forth in claim 5 which includes, pumping a liquid admixture of resin constituents into said opening, and reacting the constituents of said liquid admixture to fill said opening with cellular polyurethane to secure said solidified molten material adjacent the inner wall of said metallic tube.

7. A process for balancing tubular shafting as set forth in claim 2 which includes, forming a aperture in said metallic tube at a location diametrically opposite the location where additional weight is required to balance said tubular shafting.

8. A process for balancing tubular shafting as set forth in claim 3 which includes, forming said passageway with a greater cross sectional area adjacent said location where additional weight is required to balance said tubular shafting than adjacent said aperture.

9. A process for balancing tubular shafting as set forth in claim 1 in which said molten material comprises a molten metal.

* * * * *